Dec. 4, 1951 W. E. HOUK 2,577,657
RESTRICTED BUTTERFLY VALVE
Filed May 24, 1946
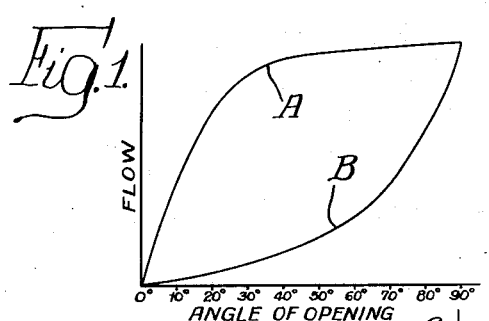
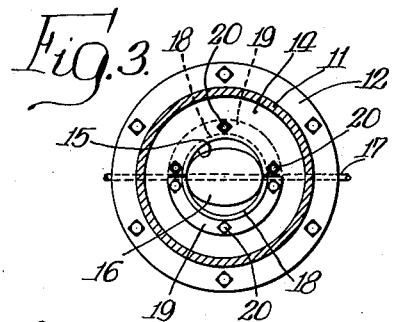
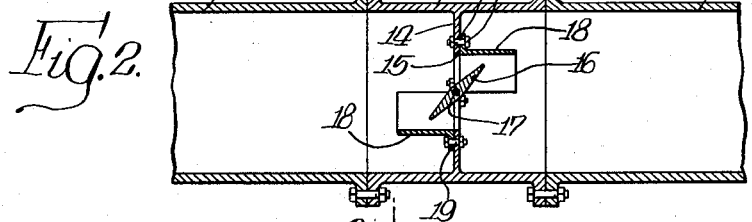
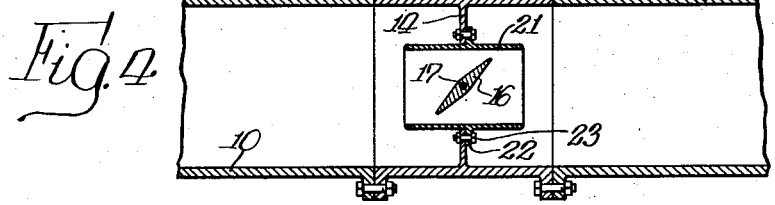
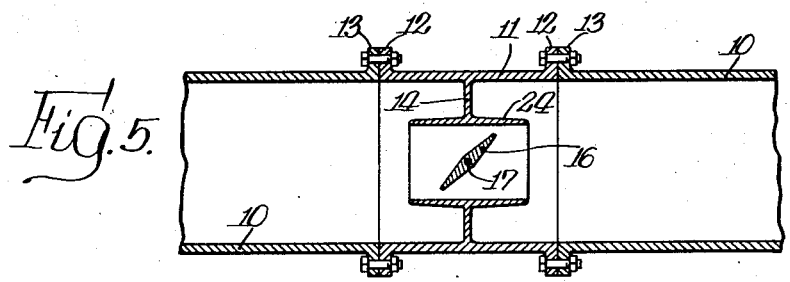
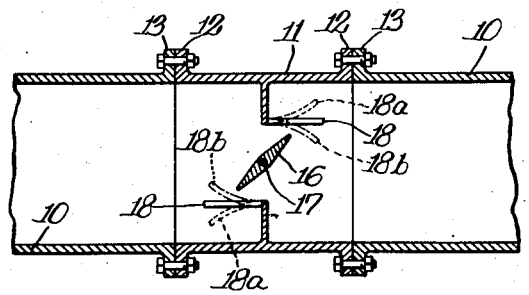
INVENTOR.
Warren E. Houk
BY
Chritton, Schaeder, Merriam &
Hofgren Attys.

Patented Dec. 4, 1951

2,577,657

UNITED STATES PATENT OFFICE 2,577,657

RESTRICTED BUTTERFLY VALVE

Warren E. Houk, Chicago, Ill., assignor to Askania Regulator Company, Chicago, Ill., a corporation of Illinois Application May 24, 1946, Serial No. 672,060

12 Claims. (Cl. 251—11)

1

The invention relates generally to means for controlling the flow of fluid, particularly gases, and relates more particularly to butterfly valve means.

Butterfly valves are customarily employed where the flow of gases is to be controlled. At times the butterfly valve has a diameter substantially equal to the internal diameter of the conduit through which the flow of gas is to be controlled. At other times, however, particularly where the conduit is large and the flow of gas is at times likely to be but a small fraction of the full capacity of the conduit, the butterfly valve is made smaller than the diameter of the conduit and the conduit restricted to provide an opening having a diameter approximately equal to the butterfly valve. This is necessary because a butterfly valve of the diameter of the conduit would not give good regulation in the flow of a small percentage of the maximum capacity of the conduit.

Unfortunately, however, the provision of a restricted area and a correspondingly reduced butterfly valve was not a complete and wholly satisfactory solution to the problem. The restricted butterfly valve results in an unstable control because of the rapid increase in ratio of area of opening to degree of opening of the valve at the lower values. Moreover, such construction was found to render the last forty or so degrees of vane travel, speaking now of movement in the direction of opening, entirely useless and ineffective. It was also found that calculations as to the flow which would result from a certain degree of valve opening were entirely erroneous and unreliable.

It is an object of this invention, therefore, to provide a restricted butterfly valve means which promotes stability of control, particularly at the lower values of valve-open position.

Another object is to provide a restricted butterfly valve means having a moderate change in the ratio of area of opening to degree of opening of the valve means, particularly at the lower, more critical values of valve-open position.

Another object is to provide a butterfly valve means which may be varied to give to the valve means any one of numerous different characteristics varying from that of a conventional, nonrestricted butterfly valve means to a typical, restricted butterfly valve means.

A further object is to provide a construction in which the extent of the restriction and hence the size of the butterfly valve means may be varied as well as varying the characteristic of the valve means.

Other objects and advantages will become apparent from the following detailed description taken in connection with the accompanying drawings, in which:

Fig. 1 is a graph illustrating flow of fluid relative to valve opening for a typical nonrestricted butterfly valve and a typical restricted butterfly valve under conditions of substantially constant pressure drop across the valve.

Fig. 2 is a longitudinal diametrical section of one form of restricted butterfly valve means embodying the features of my invention.

Fig. 3 is a transverse sectional view taken approximately along the line 3—3 of Fig. 2.

Fig. 4 is a longitudinal diametrical section of a modified form of restricted valve means embodying the features of my invention.

Fig. 5 is a longitudinal diametrical section of still another modified form of restricted butterfly valve means embodying the features of my invention.

Fig. 6 is a view similar to Fig. 2 illustrating by broken line outline possible shapes which the embodiments of the invention illustrated in Figs. 2 to 5 might take for obtaining variation in the characteristics of the valve means.

While the invention is susceptible of various modifications and alternative constructions, it is shown in the drawings and will hereinafter be described in three embodiments. It is not intended, however, that the invention is to be limited thereby to the specific constructions disclosed. On the contrary, it is intended to cover all modifications and alternative constructions falling within the spirit and scope of the invention as defined in the appended claims.

Referring first to all forms of the invention disclosed and speaking generally, there is disclosed in each of Figs. 2 to 5, by way of example, a conduit 10 of substantial diameter through which fluid, usually a gas, is to flow with the rate of flow to be controlled. Usually a butterfly valve means is employed to effect this control. In many instances, the butterfly valve has a diameter substantially equal to the internal diameter of the conduit 10. As above stated, however, this is unsatisfactory and gives unstable control where the flow at times is but a fraction of the full capacity of the conduit 10. In such instances, it has been the practice to provide what is commonly referred to as a restricted butterfly valve means. This means usually consists of a short tubular section 11 of the same diameter as the conduit 10 having at each end a radially outwardly extending flange 12 adapted to be bolted or otherwise secured to similar flanges 13 formed on the ends of the conduit 10 for securing the section 12 in position in the conduit. Extending radially inwardly is an annular flange 14 forming a restriction in the conduit leaving an aperture 15 of materially reduced area. Pivotally mounted within the aperture 15 is the vane 16 of the butterfly valve means. This customarily is fast on a shaft 17 which at one end at least projects outwardly through the section 11 for connection with vane-actuating and positioning mechanism.

As above pointed out, the employment of a restricted butterfly valve means is, however, not a complete or wholly satisfactory solution to the problem, for such a restricted butterfly valve means tends to produce unstable control at the lower, more critical values of valve opening. This is believed to be due to the very great increase of area of opening relative to angle of valve opening at the lower values of open position of the valve means. This results, as best seen from Fig. 1, in a very rapid increase in flow of fluid as the valve is initially swung from closed toward open position, this flow being represented by the curve A in Fig. 1. Note also from curve A that the valve ceases to have an effect after it reaches a position of approximately 50° away from closed position. Still referring to Fig. 1, the curve B represents the flow that is obtained for the various angular positions of a nonrestricted butterfly valve means.

The very steep nature of the early portion of the curve A indicates, as is borne out in practice, that the valve means tends to create great instability for the smaller angular positions. To overcome this deficiency produced by unusually rapid increase in the ratio of area of opening to angular position of the valve means, means is provided for reducing or restricting the ratio of area of opening to valve position. While this might be accomplished in a variety of ways, it is herein accomplished by the addition of means extending generally longitudinally of the tubular section 11 from the inner peripheral edge of the restricting flange 14 so as to provide passage-forming means cooperating with the vane of the valve means for some time as the vane is swung from fully closed toward open position.

In the form of the invention shown in Figs. 2 and 3, this means takes the form of a pair of semicylindrical elements 18, the one extending in one longitudinal direction from the restricting flange 14 and the other extending in the opposite longitudinal direction. The direction in which the elements extend will be determined by the direction of rotation of the vane 16 with the elements extending in that longitudinal direction in which the edge of the vane travels as it is swung from closed toward open position. Each of the elements 18 is at one end formed with a flange 19 adapted removably to be secured as by bolts 20 on the restricting flange 14.

In Fig. 4 there is disclosed a slightly modified construction. In place of the separate elements 18, there is provided a single cylindrical element 21. This is made small enough to pass through the opening in the flange 14 and is intermediate its ends formed with a radially outwardly extending flange 22, which has an external diameter sufficiently greater than the diameter of the opening 15 so as to overlap the flange 14 and thus permit securing of the cylindrical section 21 to the flange 14 by means such as bolts 23 extending through both flanges. The cylindrical section 21, of course, extends to both sides of the flange 14 and mounted within it is the valve element or vane 16 the same as in the form above described. It will be appreciated that one advantage of this construction is that without change in the size of the opening 15 in the flange 14 the control passage and butterfly valve mounted therein can be varied in size by substituting cylindrical elements 21 and valve elements 16 of different size, the change in diameter of the cylindrical element 21 being compensated for by enlargement of the flange 22.

In Fig. 5 there is disclosed still another slightly modified form. This form, like that of Fig. 4, has area-of-valve-opening restricting means 24 which is tubular. Herein, however, this tubular portion is formed integrally with the flange 14 rather than being removable. It extends, of course, on both sides of the flange and pivotally mounted within it is the valve element or vane 16. In each of the forms disclosed herein by way of exemplary embodiment, the lateral extensions carried by the flange 14 are cylindrical or semi-cylindrical. It is to be understood, of course, that they will conform to the shape of the opening 15 in the flange 14 and that this shape may well vary and that, accordingly, the extensions will vary. Further, the extensions herein are shown as of uniform cross sectional area throughout their length. In addition to being shown in Figs. 2 to 5, they are somewhat diagrammatically shown in Fig. 6. With such uniform extensions there would result a flow of fluid through the opening corresponding generally to the curve B of Fig. 1. Obviously, of course, this invention contemplates modification of the shape of the extensions 18 so as to obtain valve means having different characteristics. Thus the extensions might flare radially outwardly, as indicated by the broken line extensions 18a of Fig. 6. The extensions might be conical or parabolic, or possibly even other shapes. With such outwardly flaring extensions, the flow obtained would be represented by a curve lying above the curve B and below the curve A, approximating A more closely as the extension flares outwardly to such extent as to more closely approximate a restricted butterfly valve means without extensions. On the contrary, the extensions might flare inwardly as shown diagrammatically at 18b in Fig. 6. Under those circumstances, the flow would be represented by a curve lying below the curve B. Thus it is believed apparent that with this invention almost any desired characteristic could be obtained. Above all, a restricted butterfly valve is by the concept herein disclosed rendered operable to produce greater stability of control at the smaller values of opening and can, if desired, avoid having the last 40° or 50° of valve opening movement useless and ineffective.

I claim as my invention:

1. Means for controlling the flow of fluid in a conduit comprising means for interposition in a conduit, a flange extending radially inwardly from said means providing a restricted opening smaller than adjacent portions of the conduit, a butterfly valve element pivotally mounted in said flange to control the opening therein, and a generally longitudinal extension carried by said flange over substantially its entire circumference, said extension conforming to the shape of the opening in said flange and projecting in the general direction of opening movement of the adjacent edge of said valve element beyond the edge of said valve element in any position thereof.

2. Means for controlling the flow of fluid in a conduit comprising means for interposition in a conduit, a flange extending radially inwardly from said means providing a restricted opening smaller than adjacent portions of the conduit, a butterfly valve element pivotally mounted in said flange to control the opening therein, and means carried by said flange at the peripheral portions of the opening remote from the axis of said valve element and projecting in opposite directions laterally of said flange, said means at said flange conforming to the opening in said flange and extending to the same side of said flange as the adjacent portion of said valve element and beyond the edge thereof when in open position.

3. Means for controlling the flow of fluid in a conduit comprising means for interposition in a conduit, a flange extending radially inwardly from said means providing a restricted opening, a butterfly valve element pivotally mounted in said flange to control the opening therein, and means carried by said flange and projecting in opposite directions laterally operable to reduce the ratio of area of opening to degree of opening of the valve means for given positions of said valve element relative to a restricted valve without said last named means.

4. A restricted butterfly valve unit comprising, in combination, a tubular portion adapted to be interposed in a conduit and having a transverse cross sectional area conforming to that of the conduit, a flange extending radially inwardly of said tubular portion at a point intermediate the ends thereof providing a restricted opening, a pivoted valve element mounted in said flange to control the opening therein, and means carried by said flange extending in opposite directions laterally of said flange forming false walls confining the area of opening of the valve means.

5. Means for controlling the flow of fluid in a conduit comprising means for interposition in a conduit, a flange extending radially inwardly from said means providing a restricted opening, a butterfly valve element pivotally mounted in said flange to control the opening therein, and a pair of lateral projections carried by said flange and extending in opposite directions, said projections being associated with opposite halves of said flange and disposed on that side of said flange on which the adjacent edge of the valve element lies when in open position.

6. Means for controlling the flow of fluid in a conduit comprising means for interposition in a conduit, a flange extending radially inwardly from said means providing a restricted opening, a butterfly valve element pivotally mounted in said flange to control the opening therein, and a pair of lateral projections carried by said flange and extending in opposite directions, said projections being removably associated with opposite halves of said flange and disposed on that side of said flange on which the adjacent edge of the valve element lies when in open position.

7. A restricted butterfly valve unit comprising, in combination, a tubular portion adapted to be interposed in a conduit and having a transverse cross sectional area conforming to that of the conduit, a flange extending radially inwardly of said tubular portion at a point intermediate the ends thereof providing a restricted circular opening, a pivoted circular valve element mounted in said flange to control the opening therein, and a pair of projections removably attached to said flange, said projections being generally semicylindrical and having an internal diameter equal to that of the opening in said flange and projecting in opposite directions laterally of said flange, each being on that side of said flange on which the adjacent half of said valve element lies when in open position.

8. A restricted butterfly valve unit comprising, in combination, a tubular portion adapted to be interposed in a conduit and having a transverse cross sectional area conforming to that of the conduit, a flange extending radially inwardly of said tubular portion at a point intermediate the ends thereof providing a restricted opening, a pivoted valve element mounted in said flange to control the opening therein, and tubular means carried by said flange and extending in both directions laterally of said flange.

9. A restricted butterfly valve unit comprising, in combination, a tubular portion adapted to be interposed in a conduit and having a transverse cross sectional area conforming to that of the conduit, a flange extending radially inwardly of said tubular portion at a point intermediate the ends thereof providing a restricted opening, a tubular element adapted to be received in the opening in said flange having intermediate the ends thereof a radially outwardly extending flange larger than the opening in said first mentioned flange, means for removably securing said tubular element to said first mentioned flange with said tubular element extending to both sides of said first mentioned flange, and a valve element pivotally mounted in said tubular element.

10. A restricted butterfly valve unit comprising, in combination, a tubular portion adapted to be interposed in a conduit and having a transverse cross sectional area conforming to that of the conduit, a flange extending radially inwardly of said tubular portion at a point intermediate the ends thereof providing a restricted circular opening, a cylindrical element receivable in the opening in said flange and having intermediate the ends thereof a radially outwardly extending flange larger than the opening in said first mentioned flange, means for removably securing said cylindrical element in the opening in said first mentioned flange and projecting to both sides thereof, and a valve element pivotally mounted in said cylindrical element.

11. A restricted butterfly valve unit comprising, in combination, a tubular portion adapted to be interposed in a conduit and having a transverse cross sectional area conforming to that of the conduit, a flange extending radially inwardly of said tubular portion at a point intermediate the ends thereof providing a restricted opening, a tubular element formed integrally with said flange and extending in both directions laterally of said flange, and a pivoted valve element mounted within said flange and tubular extensions to control the flow of fluid therethrough.

12. A device for controlling the flow of fluid in a conduit comprising means for interposition in a conduit including a radially inwardly extending flange providing a restricted opening smaller than adjacent portions of the conduit, means on said flange near the inner edge thereof extending generally longitudinally of the device, and a butterfly valve element pivotally mounted in the means on said flange intermediate the ends thereof to control the opening therein, the means on said flange projecting in opposite directions from the axis of said valve element in the general direction of opening movement of the adjacent edge of said valve element and beyond the edge of said valve element in any position thereof.

WARREN E. HOUK.

REFERENCES CITED

The following references are of record in the file of this patent:

UNITED STATES PATENTS

| Number | Name | Date |
|---|---|---|
| 44,109 | Noble | Sept. 6, 1864 |
| 1,731,214 | Eshbaugh | Oct. 8, 1929 |
| 2,278,421 | Brown | Apr. 7, 1942 |